June 4, 1940.  J. KOLBE  2,203,056
SUSPENSION OF VEHICLES
Filed July 6, 1937  5 Sheets-Sheet 1
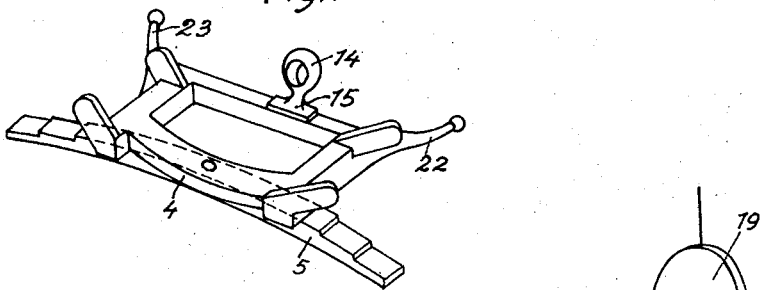
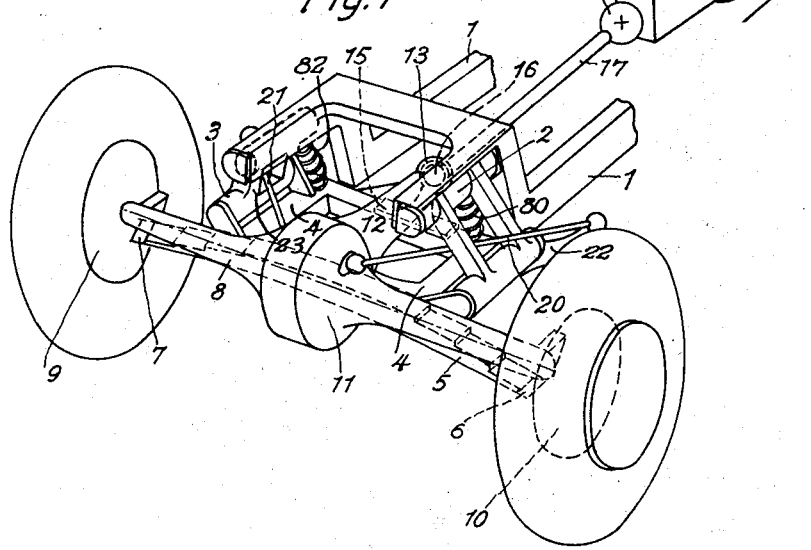
Inventor:
Joachim Kolbe
BY Bryant & Lowry, ATTORNEYS.

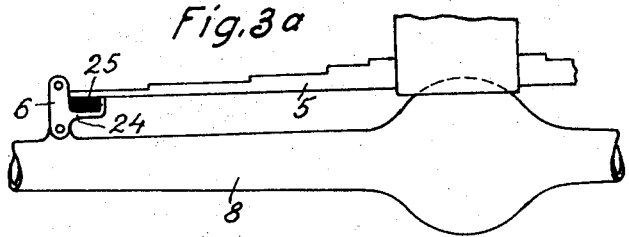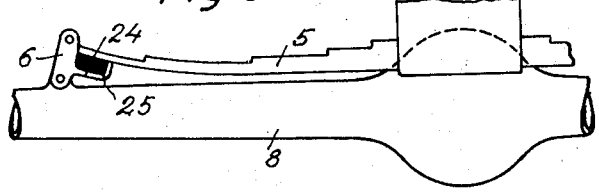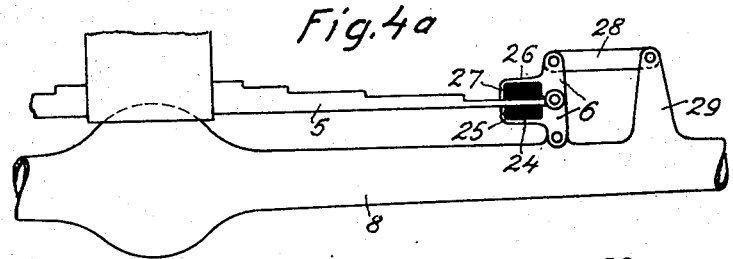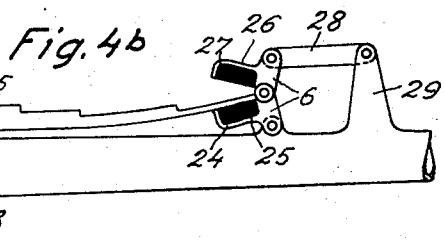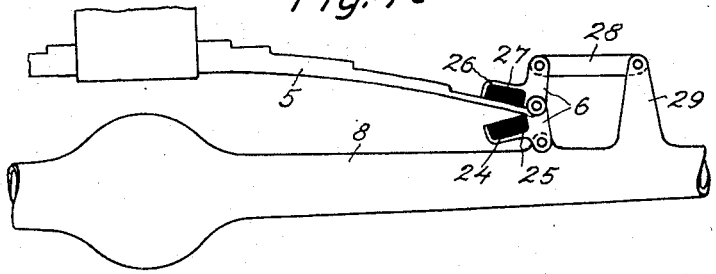

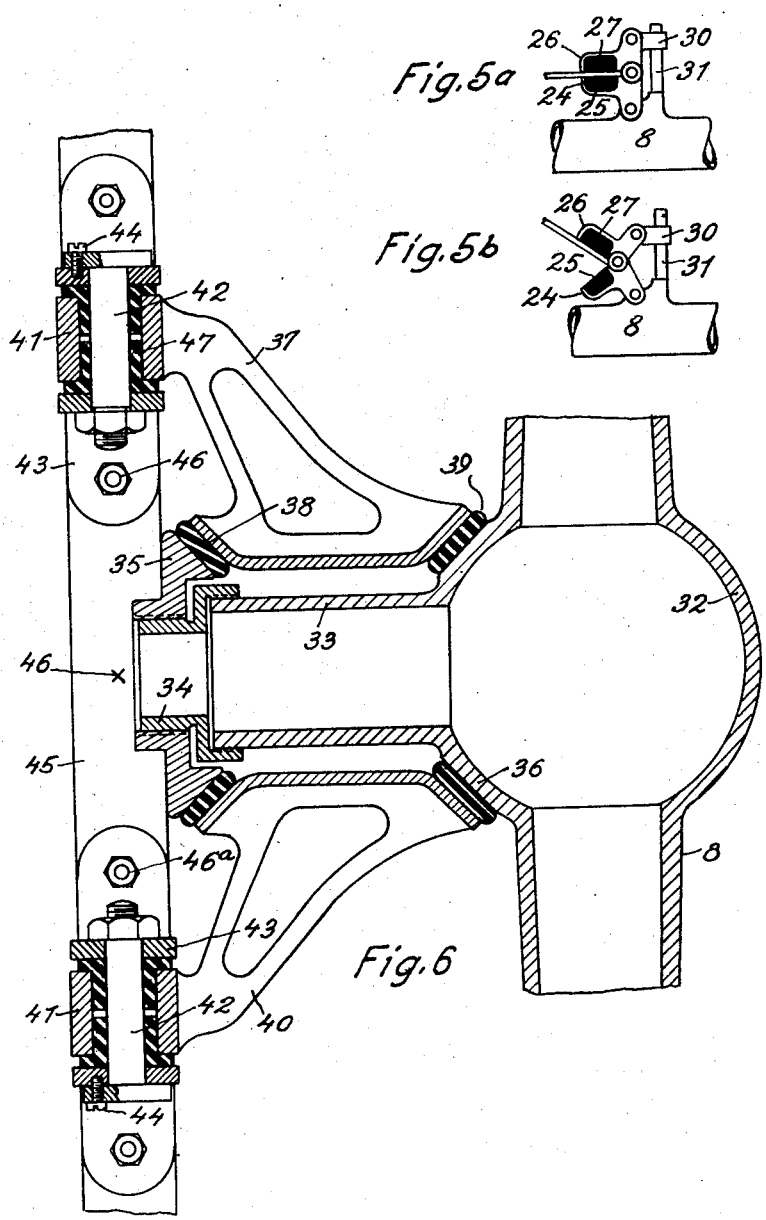

June 4, 1940.  J. KOLBE  2,203,056
SUSPENSION OF VEHICLES
Filed July 6, 1937   5 Sheets-Sheet 4

INVENTOR
Joachim Kolbe.
BY Dike Calver and Gray
ATTORNEYS.

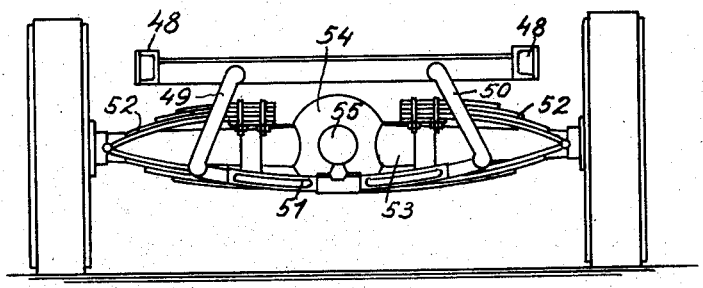
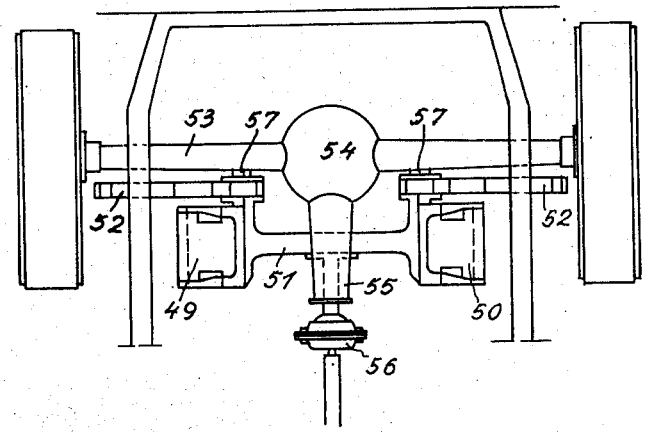

Patented June 4, 1940

2,203,056

UNITED STATES PATENT OFFICE 2,203,056

SUSPENSION OF VEHICLES

Joachim Kolbe, Hanover, Germany

Application July 6, 1937, Serial No. 152,165
In Germany July 7, 1936

15 Claims. (Cl. 280—112)

This invention relates to motor vehicles, and more particularly to suspension means for the superstructure of motor vehicles.

The invention relates generally to a special arrangement of guide link members for canting or banking the body of vehicles, such that these link members are supported on the associated axles of the vehicle, so that the axles are connected solely by the canting upper structure indirectly through the intermediary of the link members. In such vehicles the springing may in certain cases be dispensed with; it is, however, to be recommended, more particularly in the case of passenger vehicles, where springing has to be particularly efficient, to incorporate the usual springing systems in such a manner that the link members are attached to the axle-frames, from which the vehicles also are suspended by means of swinging or oscillating axles.

The invention has for one of its primary objects to provide a vehicle having rigid axles in which the superstructure adopts an inclined position, with rigid axles, whilst retaining the usual springing. According to a further object of the invention, the superstructure of the vehicle is supported by means of the link members on an axle-frame to which the rigid axles are attached by means of arms rigidly fixed to it and provided with an articulation and by means of a spring arrangement. The axle-frame rests on the springing or is suspended from it, and the articulated connection between the axle-frame and rigid axle enables the axle-frame to move upwards and downwards when springing. As it is also desirable for the rigid axle to take up a certain indirect position with respect to the road surface, the articulation between rigid axle and axle-frame must fulfil two conditions, namely: the rigid axle must be capable of swinging about this articulation upwards and downwards and, on the other hand, the rigid axle must also be capable of a certain turning motion within the articulation.

The characterised connection between the superstructure vehicle and the rigid axle is suitable both for the front axle and for the rear axle of vehicles. At the rear axle the differential casing with the forwardly extending tube for the drive shaft is used as a pivoting arm.

As the articulation a ball and socket joint may be used, which however, besides allowing the above-mentioned swinging and turning motions, allows a lateral swinging motion of the axle. Hence with a ball and socket joint, means should be provided which will prevent a lateral motion of the axle, for instance connecting rods which engage at the middle of the axle and at the outer edge of the axle-frame.

A double elliptical spring may also be disposed between axle and axle-frame. It is then not necessary to provide special means for preventing the transverse displacement, as this is rendered impossible by the mode of springing itself. Owing to the circumstance, that only two articulated connections, namely the two spring ends, are required between axle and axle-frame, no link quadrilateral is formed, such as there is when suspension gear is interposed and therefore provides the possibility of transverse displacement. Nevertheless, in the present case the axle can rise, fall and cant with respect to the axle-frame.

In the accompanying drawings the invention is illustrated by several constructional examples:

Figure 1 shows in perspective the rear part of a vehicle;

Figure 2 is a similar view of the axle frame;

Figures 3a and 3b show means at the spring ends for preventing the lateral motion of the axle;

Figures 4a, 4b and 4c show a similar construction to Figure 3;

Figures 5a and 5b show a detail of Figure 4 in a somewhat modified form;

Figure 6 shows another form of the articulation;

Figure 7 is a cross-section through another constructional form, and

Figure 8 is a corresponding plan view.

Figure 6A:
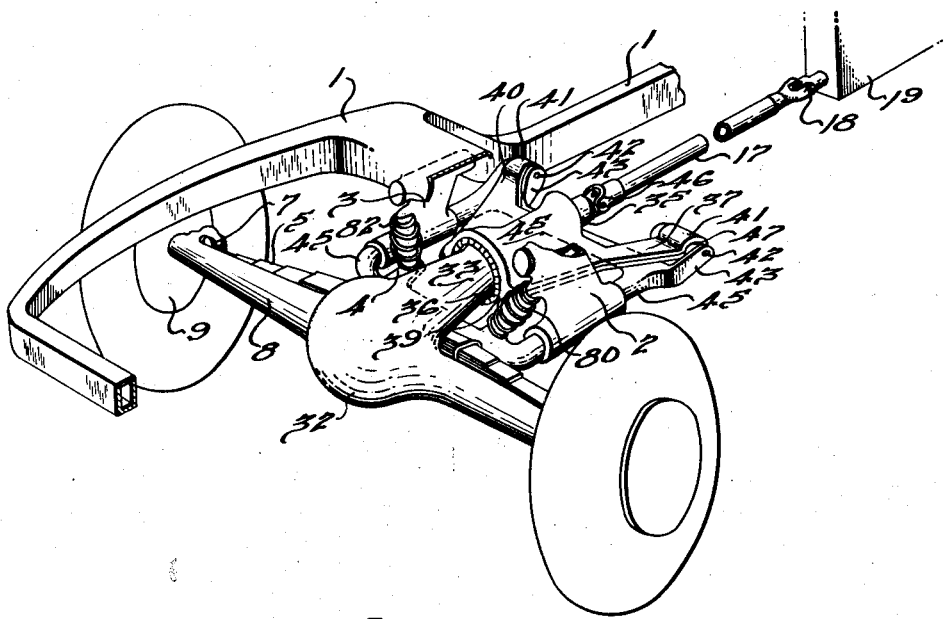
Figure 6a is a perspective view of the embodiment illustrated in Figure 6.

According to Figure 1 the frame 1 of the vehicle is supported by link members 2 and 3 on an axle-frame 4. This axle-frame itself rests on a spring 5 which in the example illustrated has the form of a transverse leaf spring, and is suspended by means of suspension devices 6 and 7 from the rigid axle 8.

The rigid axle 8, which carries the brake-drums 9 and 10 in the known manner, contains in the example illustrated, in which it is the rear axle, the differential casing 11 with the forwardly extending tube 12, through which the drive shaft extends. The forward end of the tube 12 is provided with a hollow spherical part 13, received within a ring-shaped member 14 having a spherical outer surface (Figure 2), which is provided on a projecting piece 15 on the forward part of the axle-frame. Within the ball and socket universal joint 13, 14 is a joint 16 of the drive shaft 17. The second universal joint 18 is carried at the forward end of the drive shaft at the rear of the transmission gear-box.

As will be seen, the body of the vehicle rests with the interposition of the link members and the axle-frame on the transverse leaf-spring 5 and, owing to the ball and socket joint 13, 14 the body with the axle-frame can when springing perform a vertical motion, the rigid axle swinging upwards and downwards about the point of rotation within the ball and socket joint 13 and 14. The ball and socket joint also permits of a turning motion of the rigid axle 8, for instance when only one wheel passes over a bump or other obstruction on the road. Owing to the suspension devices 6, 7, associated with the axle 8; the transverse leaf-spring 5, and the ball and socket joint 13 and 14, a slight transverse displacement of the axle may occur, which in some circumstances may be undesirable. To prevent this two transverse struts 20, 21 are provided, which at one end engage the differential casing 11, and at the other end engage two forwardly and laterally extending arms 22, 23 carried by the axle-frame 4. The points of engagement of these struts and arms lie on a line which extends perpendicularly to the longitudinal axis of the vehicle and parallel to the road surface through the ball and socket joint 13 and 14. It is desirable that the points of attachment of the arms 22, 23 be as far apart as possible in order to ensure the desired transverse stiffening.

These transverse struts will be somewhat stressed when the rigid axle 8, on the vehicle body springing, swings about the point of rotation of the ball and socket joint 13, 14, but only a very slight change will be caused between the points of attachment of the struts, which is compensated for by the struts being supported at their ends in rubber.

When the body of the vehicle mounted on the frame 1 is canted or banked with reference to the axle frame 4 by centrifugal force or otherwise in rounding a curve in the roadway, one or the other of the springs 80 or 82 will be stressed. The springs 80 and 82 interconnect the link members 2 and 3, respectively, with the axle frame 4 and will yieldingly urge the body of the vehicle back to the normal or upright position with reference to the axle frame as soon as the force urging it to cant or bank is removed or decreased.

The connection of the axle-frame 4 with the transverse leaf-spring 5 is effected in a known manner, for instance by means of clamps.

The aforesaid stabilizing means may, as shown in Figure 3, be provided on the spring suspension devices 6, 7. In this figure the transverse leaf-spring 5 is disposed above the axle 8, which arrangement is of course also possible. When springing, the spring bends in the manner shown in Figure 3b and in this case for preventing lateral motion of the axle a lateral supporting arm 24 is provided on the spring suspension means 6, which arm bears against the outermost leaf of the spring. The space between the bent arm 24, the spring leaf and the suspension means is filled with resilient material such as rubber 25. As at the other end of the spring 5 there is also a supporting arm, there can be no transverse displacement of the axle due to the articulated suspension means 6 and 7, whilst the spring action is in no way impaired. Even when the spring bends (see Figure 3b) a transverse motion is prevented.

The constructional form illustrated in Figure 3 only allows the spring to bend to one side, namely upwards. In order to enable the spring to bend both ways, the arrangement according to Figure 4 may be adopted.

In this case two supporting arms 24 and 26 with resilient rubber cushions 25 and 27 are provided, the second supporting arm being pivotally attached not to the spring suspension means 6, but with an interposed link member 28 to a separate supporting leg 29 of the axle 8. The manner in which this arrangement operates is illustrated in Figures 4b and 4c. It will be observed that whether the spring 5 bends upwards or downwards one of the supporting arms 24 or 26 comes into operation.

Figure 5 shows another way of attaching the upper supporting arm 26. In this arrangement it is supported by a guide ring 30 mounted on a vertical pin 31, the latter being fixed in a bearing of the axle 8. Figure 5b illustrates the operation whereby the guide ring 30 moves downwards on the pin 31 when the spring is flexed, resulting in the supporting arm adopting an inclined position.

Instead of a ball and socket joint other articulations may be used, for instance a constructional form as shown in Figures 6 and 6a may be employed. The differential casing 32 is provided with a forwardly extending tube 33. This tube 33 carries a supporting socket 34 provided with a bearing nut 35. The bearing nut has a ring-shaped conical surface facing towards the differential casing 32 and opposite it on the differential casing itself is a corresponding conical and ring-shaped bearing surface 36. The counter bearing surfaces are disposed on a counter bearing ring 37 and between the two ring-shaped bearing surfaces are interposed rubber rings 38 and 39 respectively. By tightening up the bearing nut 35 the desired adjustment may be effected. The two arms 37 and 40 of the counter bearing ring have at their end bearing eyes 41, through which bolts 42 are placed, which are inserted in supporting brackets 43 and are secured against turning by screws 44. The supporting brackets 43 are fixed on the forward transverse member 45 of the axle frame by means of screws 46a in such a position that the universal joint, indicated by the cross 46 on Figure 6 is situated in the axis of the bolts 42. Between the bearing eyes 41 and the bolts 42 rubber sleeves 47 are inserted.

In this case the rigid axle 8 can swing upwards and downwards, owing to the interposition of the rubber sleeves 47. At the same time a rotary motion of the axle within the bearing 35, 36 is possible, should one wheel pass over a lump or other irregularity in the road surface.

In the constructional form shown in Figures 7 and 8, which represents a back axle construction, the vehicle frame 48 is supported through link members 49 and 50 on an axle frame 51. This axle frame is itself suspended from the upper bundle of laminations of the double elliptical spring 52 which in the example shown is interrupted in the middle and thus consists of two separate halves.

The rigid axle 53 contains the differential casing 54 with the forwardly extending tube 55, the free end of which is connected by way of a hollow spherical joint 56 with the axle frame 51. The rigid axle is also connected to the lower bundles of laminations of the double elliptical spring by means of the projections 57.

Thus the axle 53 can be deflected upwards and downwards with respect to the axle frame 51 and consequently with respect to the whole of the vehicle body and can also adopt an inclined position, when a stock is imparted to one wheel, but can not give laterally, as the spring 52 permits one motion and prevents the other.

I claim:

1. In a vehicle, wherein the upper body is adapted to assume an inclined banking position when traveling over curved roads, a rigid axle, a body above the axle, and means connecting the body to the axle including an axle frame, links connecting the body to the axle frame and an articulated element and a resilient element connecting the axle frame to the rigid axle.

2. In a vehicle, wherein the upper body is adapted to assume an inclined banking position when traveling over curved roads, a rigid axle, a body above the axle, means connecting the body to the axle including an axle frame, links connecting the body to the axle frame and an articulated element and a resilient element connecting the axle frame to the rigid axle and means for restraining the rigid axle from lateral displacement.

3. In a vehicle, wherein the upper body is adapted to assume an inclined banking position when traveling over curved roads, a rigid axle, a body above the axle, means connecting the body to the axle including an axle frame, links connecting the body to the axle frame and an articulated element and a resilient element connecting the axle frame to the rigid axle and means for restraining the rigid axle from lateral displacement, the articulated element including a member rigid with the rigid axle and a universal joint between said member and axle frame whereby said rigid axle may bodily rise and fall and rotate on a horizontal axis intermediate its ends relative to the axle frame.

4. In a vehicle, wherein the upper body is adapted to assume an inclined banking position when traveling over curved roads, a rigid axle, a body above the axle, means connecting the body to the axle including an axle frame, links connecting the body to the axle frame and an articulated element and a resilient element connecting the axle frame to the rigid axle and means for restraining the rigid axle from lateral displacement, including transverse struts attached to the rigid axle midway the ends thereof and with the other ends of the struts attached to the axle frame at external points lying on a line passing through the articulation in a direction perpendicular to the longitudinal axis of the vehicle and parallel to the road surface.

5. In a vehicle, wherein the upper body is adapted to assume an inclined banking position when traveling over curved roads, a rigid axle, a body above the axle, means connecting the body to the axle including an axle frame, links connecting the body to the axle frame and an articulated element and a resilient element connecting the axle frame to the rigid axle and means for restraining the rigid axle from lateral displacement, including supporting arms on the rigid axle engaged with the resilient element at the ends thereof.

6. In a vehicle, wherein the upper body is adapted to assume an inclined banking position when traveling over curved roads, a rigid axle, a body above the axle, means connecting the body to the axle including an axle frame, links connecting the body to the axle frame and an articulated element and a resilient element connecting the axle frame to the rigid axle and means for restraining the rigid axle from lateral displacement, including movable arms carried by the rigid axle for the support of the resilient means and cushion blocks interposed between the movable arms and the resilient means.

7. In a vehicle, wherein the upper body is adapted to assume an inclined banking position when traveling over curved roads, a rigid axle, a body above the axle, and means connecting the body to the axle including an axle frame, links connecting the body to the axle frame and an articulated element and a resilient element connecting the axle frame to the rigid axle, the articulated element including a tubular member for the Cardan shaft carried by and extending forwardly of the rigid axle, the articulation of the tubular member permitting bodily upward and downward movements of the rigid axle and the tilting of either end of the axle.

8. In a vehicle, wherein the upper body is adapted to assume an inclined banking position when traveling over curved roads, a rigid axle, a body above the axle, and means connecting the body to the axle including an axle frame, links connecting the body to the axle frame and an articulated element and a resilient element connecting the axle frame to the rigid axle, the articulated element including a tubular member for the Cardan shaft carried by and extending forwardly of the rigid axle, a bearing ring rotatably supporting the tubular member and arms carried by said ring and rotatably supported at their outer ends on axes at right angles to the axis of rotation of said ring whereby the rigid axle may bodily move upwardly and downwardly and tilt at either end thereof.

9. In a motor vehicle, a rigid axle, an axle frame, resilient connecting means between the axle frame and the rigid axle, a vehicle superstructure, and connecting means between the vehicle superstructure and the axle frame whereby the superstructure may assume an inclined or banked position toward the inside of the curve with reference to the axle frame under the influence of centrifugal force as the vehicle rounds a curve.

10. In a motor vehicle, a rigid axle, an axle frame, resilient connecting means between the axle frame and the rigid axle, a vehicle superstructure, connecting means comprising angularly disposed links interposed between the vehicle superstructure and the axle frame whereby the superstructure may assume an inclined position with reference to the axle frame under the influence of forces developed as the vehicle rounds a curve, and yielding means between said links and the axle frame to yieldingly urge the superstructure toward the upright position as the force inducing the inclined position is reduced.

11. In a vehicle having a source of power, an axle adapted to receive a pair of driving wheels, an axle frame, a superstructure, spring means between the axle and the axle frame, power transmitting means including a universal joint interconnecting the source of power and axle, connecting means between the axle and the axle frame whereby the axle may oscillate vertically relative to the axle frame about an axis intersecting the universal joint, and connecting means between the superstructure and axle frame whereby the superstructure may assume an inclined or banked position relative to the axle frame under the influence of lateral forces.

12. In a vehicle having a source of power, an axle adapted to receive a pair of driving wheels, an axle frame, spring means between the axle and the axle frame, power transmitting means including a universal joint interconnecting the source of power and axle, connecting means between the axle and the axle frame whereby the axle may oscillate vertically relative to the axle frame about an axis substantially intersecting the universal joint, a vehicle superstructure, and connecting means between the superstructure and the axle frame whereby the superstructure may assume an angular position relative to the axle frame as the vehicle is subjected to forces developed as the vehicle rounds a curve.

13. In a vehicle having a source of power, an axle adapted to receive a pair of driving wheels, an axle frame, a superstructure, spring means between the axle and the axle frame, power transmitting means including a universal joint interconnecting the source of power and axle, connecting means between the axle and the axle frame whereby the axle may oscillate vertically relative to the axle frame about an axis intersecting the universal joint, means associated with the axle and the axle frame to prevent lateral displacement of the axle relative to the axle frame, and connecting means between the superstructure and axle frame whereby the superstructure may assume an inclined or banked position relative to the axle frame under the influence of lateral forces.

14. A vehicle comprising a generally laterally extending wheel supporting member, an axle frame member mounted on the wheel supporting member for vertical oscillation therewith, means to hold said member and frame against lateral displacement, a vehicle superstructure, and connecting means including angularly disposed links interposed between the frame and superstructure whereby the superstructure may assume an inclined position relative to the frame as the vehicle is subjected to lateral forces.

15. A vehicle comprising a generally laterally extending wheel supporting member, a frame member mounted on the wheel supporting member for vertical oscillation therewith, means to hold said member and frame against lateral displacement, a vehicle superstructure, connecting means including angularly disposed links interposed between the frame and superstructure whereby the superstructure may assume an inclined position relative to the frame as the vehicle is subjected to lateral forces, and yielding means between the superstructure and frame member to progressively return the superstructure to the normal position relative to the frame member as said lateral forces are diminished.

JOACHIM KOLBE.